United States Patent
Yang et al.

(10) Patent No.: US 12,533,815 B1
(45) Date of Patent: Jan. 27, 2026

(54) AUTOMATIC END EFFECTOR TIP POSITION INITIALIZATION MECHANISM FOR MICROMANIPULATION SYSTEM

(71) Applicant: Zhejiang University, Hangzhou (CN)

(72) Inventors: Liangjing Yang, Hangzhou (CN); Tiexin Wang, Hangzhou (CN); Yun Long, Hangzhou (CN); Tianle Weng, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 19/075,819

(22) Filed: Mar. 11, 2025

(30) Foreign Application Priority Data

Aug. 14, 2024 (CN) .......................... 202411111302.6

(51) Int. Cl.
- *B25J 9/16* (2006.01)
- *B25J 7/00* (2006.01)
(Continued)

(52) U.S. Cl.
CPC .............. *B25J 9/1692* (2013.01); *B25J 7/00* (2013.01); *B25J 9/1697* (2013.01); *B25J 13/089* (2013.01); *G02B 21/32* (2013.01)

(58) Field of Classification Search
CPC ...... B25J 9/1692; B25J 9/1697; B25J 13/089; B25J 7/00; G02B 21/32
See application file for complete search history.

(56) References Cited

U.S. PATENT DOCUMENTS

| | | | |
|---|---|---|---|
| 6,358,749 B1 * | 3/2002 | Orthman ................ | G02B 21/32 435/286.2 |
| 2025/0127583 A1 * | 4/2025 | Ang ........................ | B25J 15/12 |

FOREIGN PATENT DOCUMENTS

| | | |
|---|---|---|
| CN | 206671669 U | 11/2017 |
| CN | 108415149 A | 8/2018 |
(Continued)

OTHER PUBLICATIONS

Liu et al., "Locating End-Effector Tips in Robotic Micromanipulation," Feb. 2014, IEEE Transaction on Robotics, vol. 30, No. 1, pp. 125-130 (Year: 2014).*

(Continued)

*Primary Examiner* — Spencer D Patton
(74) *Attorney, Agent, or Firm* — Addison D. Ault; IPGentleman Intellectual Property Services, LLC

(57) ABSTRACT

An automatic end effector tip position initialization mechanism for a micromanipulation system is provided. The method includes: S1, positioning a macro end effector tip, calculating a camera pose by using ArUco Tag, and realizing a three-dimensional positioning of the end effector tip by using a triangulation method, and moving the end effector to a area near a center of a focal plane based on a visual servo; S2, positioning a micro end effector tip; S3, acquiring calibration data based on a visual servo, calibrating the end effector tip and the petri dish, and obtaining a left calibration matrix and a right calibration matrix reflecting the transformation relationship between left and right micromanipulator coordinates and image coordinates; generating an intuitive human-computer interaction interface based on a mouse and a keyboard according to acquired position information. The method has obvious advantages in terms of operation accuracy, operation efficiency and repeatability.

8 Claims, 11 Drawing Sheets

(51) Int. Cl.
*B25J 13/08* (2006.01)
*G02B 21/32* (2006.01)

(56) References Cited

FOREIGN PATENT DOCUMENTS

| CN | 112136071 A | 12/2020 |
|---|---|---|
| CN | 115151215 A | 10/2022 |
| JP | 2015082099 A | 4/2015 |

OTHER PUBLICATIONS

Jun Liu, et al., Locating End-Effector Tips in Robotic Micromanipulation, IEEE Transactions on Robotics, 2014, pp. 125-130, vol. 30, No. 1.

Liying Su, et al., Macro-to-micro positioning and auto focusing for fully automated single cell microinjection, Microsystem Technologies, 2021, pp. 11-21, vol. 27.

\* cited by examiner

AUTOMATIC END EFFECTOR TIP POSITION INITIALIZATION MECHANISM FOR MICROMANIPULATION SYSTEM

CROSS REFERENCE TO THE RELATED APPLICATIONS

This application is based upon and claims priority to Chinese Patent Application No. 202411111302.6, filed on Aug. 14, 2024, the entire contents of which are incorporated herein by reference.

TECHNICAL FIELD

The present invention relates to the field of automated micromanipulation, particularly to an automatic end effector tip position initialization mechanism for a micromanipulation system.

BACKGROUND

At present, the initialization of the end effector tip's position for the micromanipulation system is performed by an operator manually. In the manual position initialization, the operator needs to manipulate the end effector, so as to move the tip of the end effector from the initial position far from the focal plane of the microscope to the field of view of the microscope and complete the focusing. However, the above operation involves repeated conversion between the macro field of view and micro field of view, the process is cumbersome and time-consuming, and it is easy to cause accidental damage to the end effector tip. Additionally, the end effector typically needs frequent replacements during the micromanipulation, and the above position initialization operation needs to be repeated after each replacement.

In recent years, micromanipulation technology has been widely used in related research and practice in biomedical engineering fields such as assisted reproduction, pathological diagnosis, tissue engineering and regenerative medicine. However, the current micromanipulation is still highly dependent on manual operation. In order to improve the accuracy, efficiency and consistency of micromanipulation, and reduce the learning cost and labor intensity of the operator, automatic micromanipulation has become a research hotspot. Although related research has realized the automation of subtasks such as focusing, target tracking, trajectory planning and so on in the process of micromanipulation, there is still a lack of convenient and effective solution to the problem of the automatic end effector tip position initialization for the micromanipulation system.

Accurate positioning of the end effector tip is crucial before performing specific operations. Because the error in the position initialization process will continue to affect the accuracy of subsequent micromanipulation. However, the end effector tip position initialization is still highly dependent on manual and there is a steep learning curve. Because the diameter of the end effector tip is typically at the micro-nanometer level, which exceeds the perception range of human eyes, even subtle operating errors may cause damage to the end effector tip due to collision.

In order to avoid the end effector tip being damaged by collision, the mounting of the end effector is typically completed in an open space away from the petri dish. This means that the initial position of the end effector tip will exceed the field of view of the microscope. Therefore, the operator needs to estimate the relative position between the end effector tip and the microscope through the macro field of view of the human eye, and move it to the vicinity of the micro field of view of the microscope to complete the rough positioning. Subsequently, the operator also needs to observe the micro field of view of the microscope while sweeping the end effector back and forth, and the operator needs to find its tip position and complete the focusing based on the shadow generated by the end effector in the micro field of view.

The manual positioning operation involves repeated conversion between the macro field of view and the micro field of view, the process is cumbersome and time-consuming, and it is easy to cause accidental damage to the end effector tip. Additionally, the end effector usually needs to be replaced frequently during the micromanipulation process, and the above position initialization operation needs to be repeated after each replacement.

At present, the research on the automatic end effector tip position initialization for the micromanipulation system is limited.

Liu et al. achieved automated tip positioning and focusing in the 4×4×4 mm range with the detection algorithm based on the movement history image and active contour model. They detected the end effector tip and moved it to the center of the field of view of the microscope image by estimating the position of the end effector tip and using an adaptive quadtree autofocus algorithm. This method requires human pre-movement of the end effector tip to a specific area close to the micro field of view of the microscope, and requires switching of different microscope magnifications (×4, ×10, ×20) during positioning. The operation is complicated and is only suitable for commercial inverted microscopes with an objective lens changer.

Su et al. proposed an end effector tip positioning scheme using an additional macro camera, which realized the two-dimensional positioning of the end effector tip and the microscope in the macro field of view, and could move and focus the end effector tip from the macro field of view to the micro field of view. However, this method can only achieve tip positioning under the microscope's low-power objective (×4 in the paper), because it cannot obtain the distance between the end effector tip and the depth of the microscope's focal plane. Under a high-magnification objective lens, a shallow depth of field may make it difficult to identify or even completely disappear objects that are further away from the focal plane.

Therefore, in order to reduce human intervention and realize automated micromanipulation, there is an urgent requirement for an automation technology that is easy to position the end effector tip.

SUMMARY

In order to solve the above problems, this application provides an automatic end effector tip position initialization mechanism for a micromanipulation system, aiming at improving the accuracy and efficiency, and achieving the objective of easy deployment and improving compatibility.

In this application, an automatic end effector tip position initialization device for a micromanipulation system is provided, the device includes two sets of micromanipulators, a macro-micro integrated imaging system, and a computer/user interface;

the two sets of micromanipulators are three-axis Cartesian manipulators, the three-axis Cartesian manipulators are symmetrically distributed on left and right sides of a microscope, and the three-axis Cartesian manipulators are used to control an end effector and a petri dish respectively, the three-axis Cartesian manipulators are defined as a left arm and a right arm respectively;

the macro-micro integrated imaging system includes a micro-image part and a macro-image part, the micro-image part is acquired by a 20-fold objective lens digital camera, and the macro-image part is acquired by a macro camera, and macro-micro images will eventually be transmitted to the computer/user interface respectively.

In this application, an automatic end effector tip position initialization method for the micromanipulation system is further provided, the method includes the following steps:

S1, positioning a macro end effector tip, acquiring a macro image of a micromanipulation space by the macro camera, moving the end effector to analyze a position of the end effector tip in an image coordinate system, calculating a camera pose by using a black-and-white square-based fiducial marker-ArUco Tag for positioning, and realizing a three-dimensional positioning of the end effector tip by using a triangulation method, and moving the end effector to an area near a center of a focal plane based on a visual servo;

S2, positioning a micro end effector tip, and conducting the positioning in a 4×2×2 mm rectangular region, using a shadow projected by the end effector in a microscope image to position a shaft and the tip of the end effector, and moving the end effector tip to the focal plane;

S3, acquiring calibration data based on a visual servo, wherein the calibration data is calibration data containing micro-image position information and micromanipulator encoder position information, calibrating the end effector tip and the petri dish, and obtaining a left calibration matrix and a right calibration matrix reflecting the transformation relationship between left and right micromanipulator coordinates and image coordinates; and S4, generating an intuitive human-computer interaction interface based on a mouse and a keyboard according to position information acquired by S1-S3, wherein microscopic information in the interface is used for local precision micromanipulation, and macroscopic information is used for helping an operator to master a global environment.

Preferably, the specific steps of S1 are as follows:

S101, based on ArUco Tag, selecting a region of interest (ROI) in the macro camera image, and positioning a two-dimensional position of the end effector tip in the image coordinate system through a movement of the micromanipulator;

S102, based on the image coordinates of the tip before and after the movement and the corresponding camera pose, estimating the three-dimensional position of the end effector tip by the triangulation method;

S103, analyzing a position difference between the center of the focal plane of the microscope and the end effector tip, and moving the end effector tip to a target area by visual servo.

Preferably, the specific contents of selecting the ROI in the macro camera image and positioning the two-dimensional position of the end effector tip in the image coordinate system in S101 are as follows:

automatically selecting the ROI containing the end effector tip based on a fiducial marker;

based on a pre-calibration of a monocular camera, obtaining an internal parameter K and a distortion coefficient D of the macro camera:

$$K = \begin{bmatrix} f_x & 0 & c_x \\ 0 & f_y & c_y \\ 0 & 0 & 1 \end{bmatrix}, D = [k_1 \ k_2 \ c_1 \ c_2 \ k_3]$$

the ArUco Tag is provided with two, Tag1 and Tag2, where Tag2 is bound to the end effector of the left arm, and moves with the micromanipulator, Tag1 is bound to the microscope, and remains stationary throughout the micromanipulation process;

through a calibrated camera and a known size of the ArUco Tag, obtaining a transformation relationship between a coordinate system $C_{t1}:(x_{t1}y_{t1}z_{t1})$, $C_{t2}:(x_{t2}y_{t2}z_{t2})$ of Tag1 and Tag2 and a coordinate system $C_c:(x_c y_c z_e)$ of the macro camera;

the expression of the coordinate system of Tag1 and Tag2 and the coordinate system of the macro camera is:

$$q_c = \begin{bmatrix} x_c \\ y_c \\ z_c \\ 1 \end{bmatrix} = \begin{bmatrix} R_{ti}^c & t_{ti}^c \\ 0 & 1 \end{bmatrix} \begin{bmatrix} x_{ti} \\ y_{ti} \\ z_{ti} \\ 1 \end{bmatrix} = T_{ti}^c q_{ti};$$

where, $C_{ti}$ is a coordinate system of Tag1 or Tag2, $q_c$ and $q_{ti}$ are homogeneous coordinates of a point in the three-dimensional space of the macro camera and the two-dimensional code coordinate system, respectively, and $T_{ti}^c$ is a transformation matrix, the transformation matrix is composed of 3×3 rotation matrix $R_{ti}^c$ and 3×1 translation vector $t_{ti}^c$;

based on the Tag1 bound to the microscope, according to a stroke of the micromanipulator, the rectangular region containing a movement range of the end effector tip is selected in the coordinate system $C_{t1}$ of the Tag1;

calculating the coordinates of projection points of cuboid endpoints in the macro camera image in the Tag1 coordinate system;

the expression for calculating the coordinates of projection points of cuboid endpoints in the macro camera image in the Tag1 coordinate system is:

$$\begin{bmatrix} u \\ v \\ 1 \end{bmatrix} = \lambda K [R_{t1}^c \ t_{t1}^c] \begin{bmatrix} x_{t1} \\ y_{t1} \\ z_{t1} \\ 1 \end{bmatrix} = \lambda M_{t1}^c \begin{bmatrix} x_{t1} \\ y_{t1} \\ z_{t1} \\ 1 \end{bmatrix};$$

where $\lambda$ denotes a scale factor, $[u,v,1]^T$ denotes pixel coordinates of the projection point, $[x_{t1}, y_{t1}, z_{t1}, 1]^T$ denotes points in the Tag1 coordinate system, and $M_{t1}^c$ denotes a projection matrix from Tag1 to the macro camera;

using a circumscribed rectangle of a convex hull of the projection point as the ROI region;

controlling the end effector to move laterally for a certain distance, acquiring the image matrix IMG and IMG' before and after the movement and calculating an image difference;

according to influence of illumination on the end effector, defining a positive part $IMG_{d+}$ and a negative part $IMG_{d-}$ of $IMG_d$ to correspond to the end effector before and after the movement, respectively;

obtaining a silhouette image of the end effector by binarizing $IMG_{d+}$, and determining a maximum contour of the image;

the expression for calculating the image difference is:

$IMG_d = IMG - IMG'$;

taking a point at a bottom right of the maximum contour of the image as the position of the end effector tip before the movement;

selecting a template at the position of the end effector tip of $IMG_{d+}$, and finding the position of the end effector tip after movement in $IMG_{d-}$ by a template matching method.

Preferably, the specific contents of estimating the three-dimensional position of the end effector tip by the triangulation method in S102 are as follows:

obtaining the image coordinates of the end effector tip, and calculating the three-dimensional position of the end effector tip in the Tag2 coordinate system by the triangulation method;

combining with the camera internal parameter K and the distortion parameter D, obtaining the pixel coordinates $p=[u,v,1]^T$, $p'=[u',v',1]^T$ before and after the movement of the end effector tip in the de-distortion image;

obtaining a camera projection matrix corresponding to the pixel coordinates by the Tag2 that is relatively static with the end effector tip;

defining the homogeneous three-dimensional coordinates of the tip in the Tag2 coordinate system as $q=[x, y, z, w]^T$;

where a transformation relationship between the three-dimensional point q and the two-dimensional image point p is: $p=\lambda M_{t2}^c q=\lambda K[R_{t2}^c t_{t2}^c]q$, where p is the pixel coordinates before and after the movement of the end effector tip in the de-distortion image, $M_{t2}^c$ denotes the projection matrix from Tag2 to the macro camera, $R_{t2}^c$ and $t_{t2}^c$ denote a rotation and projection matrix from Tag2 to the macro camera, respectively, and K is the camera internal parameter.

According to a vector parallel relationship of p and $M_{t2}^c q$, the relationship between p and $M_{t2}^c q$ is obtained;

the relationship between p and $M_{t2}^c q$ is:

$$p \times M_{t2}^c q = \begin{bmatrix} u \\ v \\ 1 \end{bmatrix} \times \begin{bmatrix} m_1 \\ m_2 \\ m_3 \end{bmatrix} q = \begin{bmatrix} vm_3 - m_2 \\ m_1 - um_1 \\ um_2 - vm_1 \end{bmatrix} q = \begin{bmatrix} 0 \\ 0 \\ 0 \end{bmatrix};$$

where $m_1$, $m_2$, $m_3$ are 1×4 row vectors constituting $M_{t2}^c$;

based on the tip coordinate p' after movement and the corresponding camera projection matrix $M'_{t2}^c$, the relationship between p' and $M'_{t2}^c$ is obtained;

the relationship between p' and $M'_{t2}^c$ is:

$$p' \times M'^c_{t2} q = \begin{bmatrix} v'm'_3 - m'_2 \\ m'_1 - u'm'_3 \\ u'm'_2 - v'm'_1 \end{bmatrix} q = \begin{bmatrix} 0 \\ 0 \\ 0 \end{bmatrix};$$

the relationship between p and $M_{t2}^c q$ and the relationship between p' and $M'_{t2}^c$ are combined with x and y, and Singular Value Decomposition (SVD) is applied to the equation x to solve a target three-dimensional point q in the containing noise situation;

the expression for the application of SVD to the solution of equation x is:

$Aq = U\Sigma V^T q = 0$;

the target three-dimensional point q, $q=v_{min}=V[:,-1]$ satisfying $Aq=0$ is obtained by analytical expression;

where, $v_{min}$ denotes an eigenvector associated with a minimum non-zero singular value a of the matrix A, according to a definition of SVD decomposition, $v_{min}$ is a last column in the matrix V, that is $V[:,-1]$;

the normalized three-dimensional coordinates of the tip are obtained by calculating, and the coordinate $q_{t1}$ of the end effector tip after the movement relative to Tag1 is obtained by the coordinate system transformation expression;

the coordinate system transformation expression is: $q_{t1} = T_c^{t1} T_{t2}^c q_{norm}$;

the coordinate $q_{t1}$ data obtained from latest five frames of images are averaged to obtain a smoothed result $\bar{q}_{t1}$.

Preferably, the specific contents of analyzing a position difference between the center of the focal plane of the microscope and the end effector tip, and moving the end effector tip to a target area by visual servo in S103 are as follows:

manually moving the end effector tip to the center of the microscope image and completing the focusing, and taking the position of the end effector tip $\bar{q}_{t1}$ obtained at this time as $q_f$;

according to a pre-recorded focal plane center position $q_f$, the system will select $q_a = q_f + d_{offset}$ as the target position;

where, $d_{offset} = [-2, 0.2, 0.7]$, contains a horizontal offset, and is convenient for the next stage of the end effector tip positioning process based on sweeping;

the scheme of target distance difference d based on real-time feedback combined with pseudo-code performs a visual servo to first control an operator tip to move above the target area, and then move downward to the target area, thereby avoiding contact with an outer wall of the petri dish, where $d = q_a - \bar{q}_{t1} = [x_d, y_d, z_d]^T$.

Preferably, the specific content of positioning a micro end effector tip in S2 is:

S201, acquiring the microscope image and completing initialization of the tool sweep detector;

S202, estimating the position of the end effector tip based on the sweeping manner, and moving the end effector tip into the microscope field of view;

S203, moving the end effector tip to the focal plane by two rounds of autofocus.

Preferably, the specific contents of acquiring the microscope image and completing the initialization of the tool sweep detector in S201 are as follows:

dividing the microscope image into 3×3 sub-regions by the tool sweep detector, where any of the sub-regions can be denoted by $r_{(m,n)}$, m, n∈(0, 1, 2);

in the initialization process, acquiring 60 frame difference image by the detector, calculating a standard deviation of an average gray value of each sub-region, and setting a threshold according to the standard deviation;

the expression for calculating the standard deviation of the average gray value of each sub-region is:

$\theta_{(m,n)} = k_d \cdot \sigma(m,n)$ where $\sigma_{(m,n)}$ denotes a standard deviation of the corresponding region, and $k_d$ denotes a pre-set trigger coefficient according to imaging conditions;

in the process of continuous detection, if the average gray level of the frame difference image of the region exceeds the corresponding threshold, the sub-region is marked for triggering.

Preferably, the specific steps of estimating the position of the end effector tip based on the sweeping manner, and moving the end effector tip into the microscope field of view in S202 are as follows:

S2021, sweeping the end effector along a $-y_1$ direction so that the end effector enters the image;

S2022, recording the position of the end effector in the coordinate system of the current micromanipulator, continuing to move along an original sweeping direction for a distance $d_s$ to ensure that the shadow of the end effector is out of the field of view, and moving along a $-x_1$ direction for a distance $d_r$ to complete a retraction of the end effector;

S2023, sweeping the end effector along the $y_1$ axis in a reverse direction, and if detecting the end effector during the movement, repeating S2022, and if not detecting the end effector after moving $2d_s$, judging that the retraction of the end effector is completed;

S2024, based on the average value of the $y_1$ direction position recorded in the last two times, moving the shaft of the end effector to the image along the $y_1$ axis through the system, and controlling the end effector to move $d_r/2$ along the $x_1$ direction, and moving the end effector tip to the microscope field of view.

In summary, this application provides the automatic end effector tip position initialization mechanism for the micromanipulation system, compared with manual position initialization, this method has obvious advantages in operation accuracy, operation efficiency and repeatability. Additionally, this method is easy to deploy, and it only needs to supplement the macro camera and the two-dimensional code for positioning on the basis of the original micromanipulation system to realize the automatic three-dimensional positioning of the end effector tip. Furthermore, the method mentioned in this application has strong compatibility and can adapt to multiple magnifications of the microscope.

Further detailed descriptions of the technical scheme of the present invention can be found in the accompanying drawings and embodiments.

BRIEF DESCRIPTION OF THE DRAWINGS

FIGS. 4A-4D are schematic diagrams of a macroscopic positioning operation of an automatic end effector tip position initialization method for a micromanipulation system according to the present invention;

DETAILED DESCRIPTION OF THE EMBODIMENTS

The technical solution of the present invention will be further elaborated hereafter in conjunction with accompanying drawings and embodiments. It should be noted that unless otherwise specified, the relative arrangements, numerical expressions and values of the components and steps described in these embodiments do not limit the scope of this application.

The following description of at least one exemplary embodiment is in fact merely illustrative and shall in no way serve as any limitation on the application and its application or use.

The techniques, methods and equipment known to ordinary technicians in related fields may not be discussed in detail, but techniques, methods and equipment should be considered as part of the specification in appropriate cases.

In all the embodiments shown and discussed here, any specific value should be interpreted as merely illustrative, not as a limitation. Therefore, other embodiments of exemplary embodiments can have different values.

Unless otherwise defined, the technical or scientific terms used in the invention shall be those to which the invention belongs.

At present, the operator typically performs the end effector tip position initialization of the micromanipulation system manually. In the manual position initialization, the operator needs to move the end effector, so as to move the end effector tip from the initial position far from the focal plane of the microscope to the field of view of the microscope and complete the focusing.

Figures 1A, 1B, 1C:
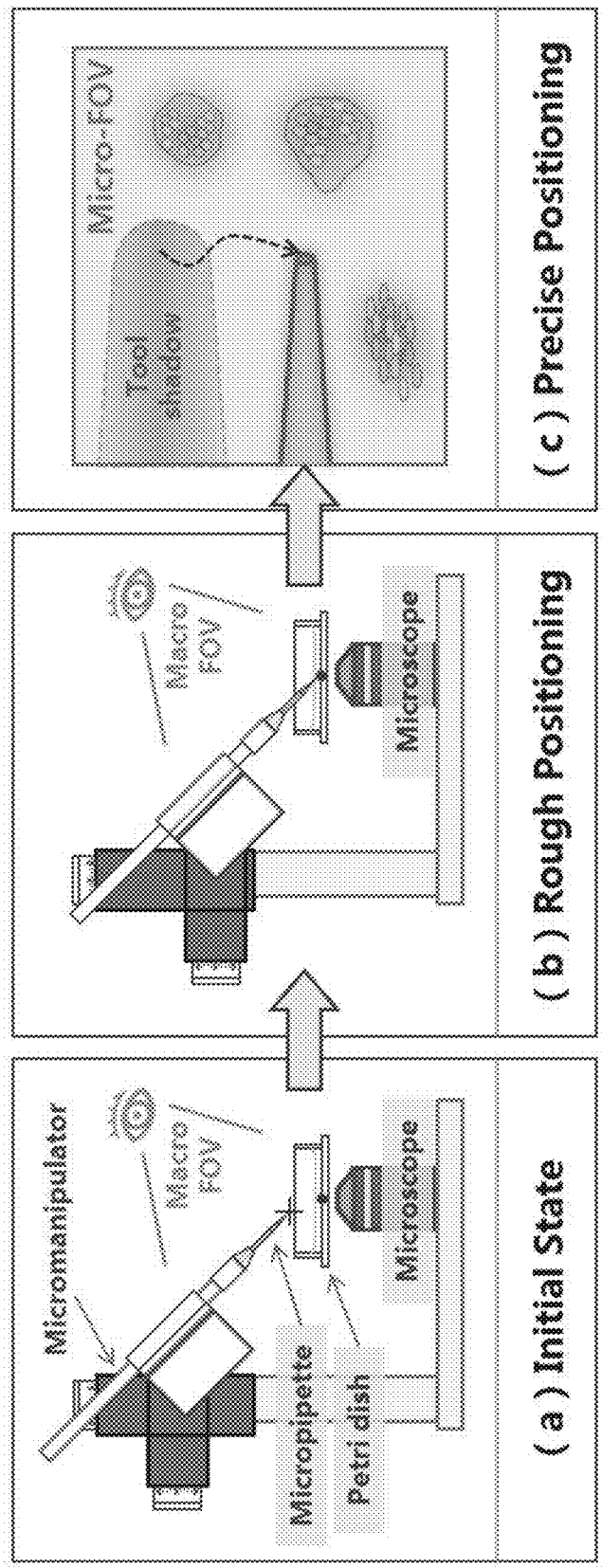
FIGS. 1A-1C are schematic diagrams of an end effector tip position initialization process for a conventional micromanipulation system.

As shown in FIGS. 1A-1C, FIG. 1A is the initial state of the micromanipulator, FIG. 1B is the rough positioning state of the microscope, and FIG. 1C is the precise positioning state of the micro field of view, and as shown in FIG. 1A, in order to avoid the end effector tip being damaged by collision, the mounting of the end effector is typically completed in an open space away from the petri dish. This means that the initial position of the end effector tip will exceed the field of view of the microscope. Therefore, as shown in FIG. 1B, the operator needs to estimate the relative position between the end effector tip and the microscope through the macro field of view of the human eye, and move it to the vicinity of the micro field of view of the microscope to complete the rough positioning. After that, as shown in FIG. 1C, the operator also needs to observe the micro field of view of the microscope while sweeping the end effector back and forth, and the operator needs to find its tip position and complete the focusing based on the shadow generated by the end effector in the micro field of view. However, the above positioning operation involves repeated conversion between the macro field of view and micro field of view, the process is cumbersome and time-consuming, and it is easy to cause accidental damage to the end effector tip. Additionally, the end effector usually needs to be replaced frequently during the micromanipulation process, and the above position initialization operation needs to be repeated after each replacement.

Figure 2:
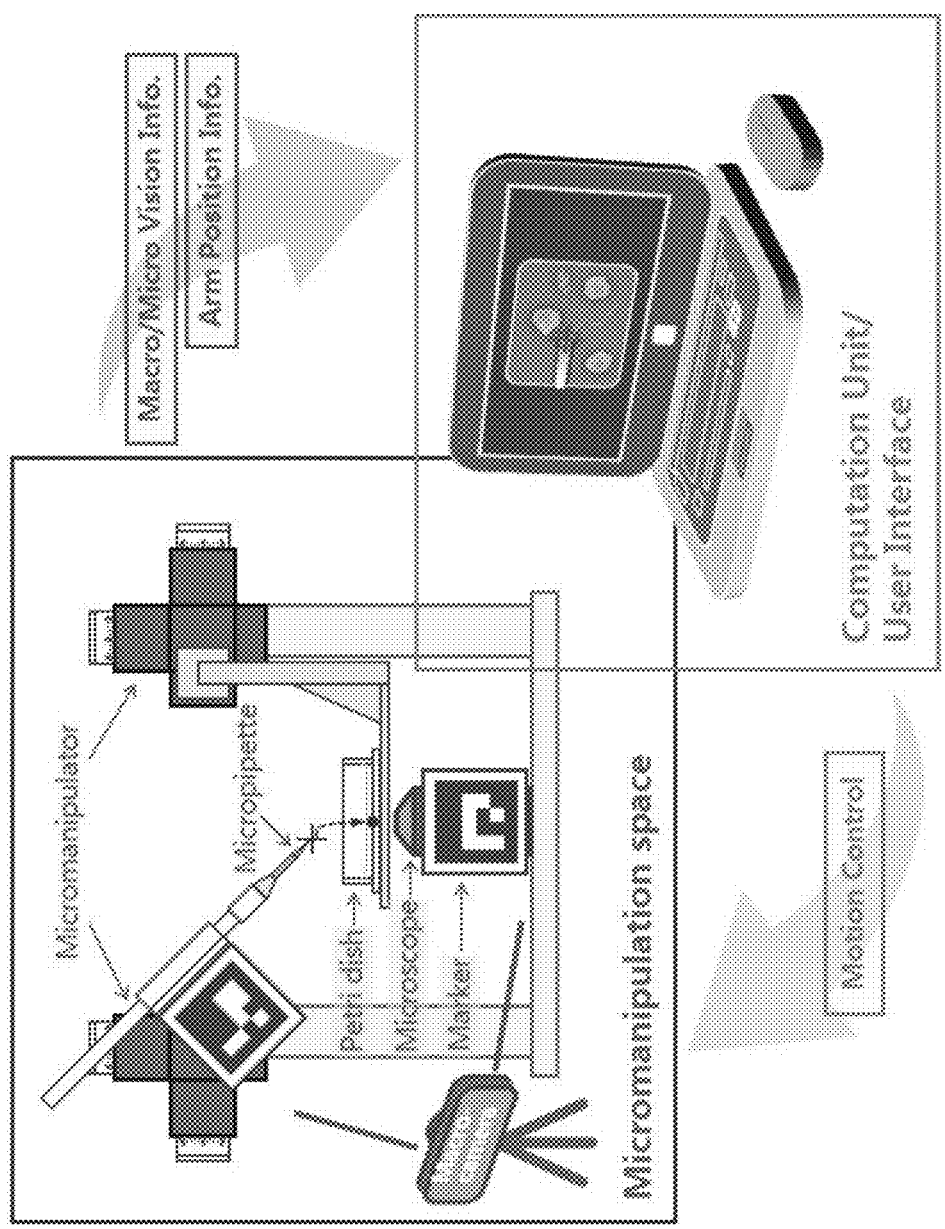
FIG. 2 is a system overview diagram of an automatic end effector tip position initialization device for a micromanipulation system according to the present invention.

As shown in FIG. 2, in this application, an automatic end effector tip position initialization device for a micromanipulation system is provided, the device includes two sets of micromanipulators, a macro-micro integrated imaging system, and a computer/user interface;

the two sets of micromanipulators are three-axis Cartesian manipulators, the three-axis Cartesian manipulators are used to realize the control of the end effector and the petri dish respectively, and the three-axis Cartesian manipulators are symmetrically distributed on the left and right sides of a microscope, the three-axis Cartesian manipulators are used to control an end effector and a petri dish respectively, the three-axis Cartesian manipulators are defined as a left arm and a right arm respectively; each axis of the micromanipulator (8MT173, Standa Ltd., Lithuania) has a single-step resolution of 1.25 m and a working range of 25 mm, and can achieve a resolution of up to 5 nm under the subdivision control of a multi-axis movement controller (8SMC5, Standa Ltd., Lithuania).

The macro-micro integrated imaging system includes a micro-image part and a macro-image part, the micro-image part is acquired by a 20-fold objective lens digital camera, and the macro-image part is acquired by a macro camera, and macro-micro images will eventually be transmitted to the computer/user interface respectively. Micro images were acquired by a digital camera (CS165MU, Thorlabs Inc., NJ, USA) equipped with a 20-fold objective lens (Plan Flour 20X/0.50, Nikon, Japan) and transmitted to a computer at a speed of 30 fps/s and a resolution of 1440×1080. The macro field of view is provided by an additional macro camera (RealSense SR305, Intel, CA, USA. Using only the RGB camera module), which can acquire images at a resolution of 1920×1080 at 15 fps, thereby providing the system with macro information including end effectors, petri dishes, and ArUco Tag. The size of the two ArUco Tags used in the system is 45 mm, and the 3D-printed connectors are fixed with the end effector and the microscope respectively.

The program in this system, wherein the program contains the parts of the image processing, controller control, and user interface, is developed based on the Python platform and runs on a computer equipped with a multi-core processor (Intel Core i7-8750H CPU @2.2 GHz). The above program can be easily deployed on any laptop running Windows 10 operating system.

Figure 3:
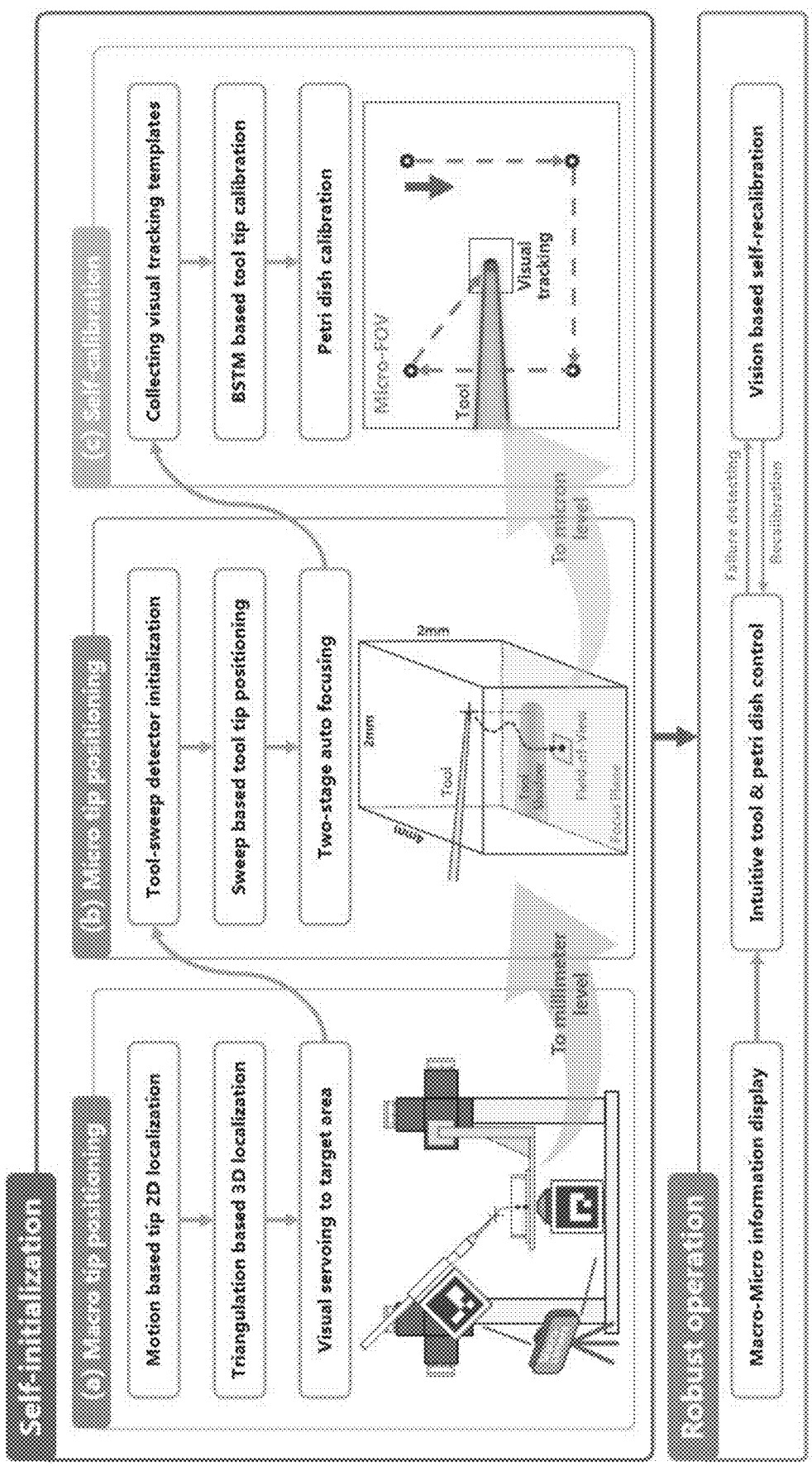
FIG. 3 is a flow chart of an automatic end effector tip position initialization method for a micromanipulation system according to the present invention.

In this application, an automatic end effector tip position initialization method for the micromanipulation system is also provided, as shown in FIG. 3, this step can be subdivided into three sub-steps from macro to micro: a macro end effector tip positioning, and a micro end effector tip positioning. Specifically, the method includes the following steps:

S1, a macro end effector tip is positioned, a macro image of a micromanipulation space is acquired by the macro camera, the end effector is moved to analyze the position of the end effector tip in an image coordinate system, a camera pose is calculated by using a black-and-white square-based fiducial marker-ArUco Tag for positioning, and a three-dimensional positioning of the end effector tip is realized by using a triangulation method, and the end effector is moved to an area near a center of a focal plane based on a visual servo;

S2, a micro end effector tip is positioned, and the positioning is conducted in a 4×2×2 mm rectangular region; a shadow projected by the end effector in a microscope image is used to position a shaft and the tip of the end effector, and the end effector tip is moved to the focal plane;

S3, calibration data is acquired based on a visual servo, wherein the calibration data is calibration data containing micro-image position information and micromanipulator encoder position information, calibrating the end effector tip and the petri dish, and obtaining a left calibration matrix and a right calibration matrix reflecting the transformation relationship between left and right micromanipulator coordinates and image coordinates; and S4, an intuitive human-computer interaction interface is generated based on a mouse and a keyboard according to position information acquired by S1-S3, wherein microscopic information in the interface is used for a local precision micromanipulation, and macroscopic information is used for helping an operator to master a global environment. During the operation, the system will detect the tip position based on visual feedback, and the system automatically performs recalibration when the calibration-based control error occurs, so as to improve the robustness and accuracy of the control.

Preferably, the specific steps of S1 are as follows:
S101, based on ArUco Tag, a region of interest (ROI) in the macro camera image is selected, and a two-dimensional position of the end effector tip in the image coordinate system is positioned through a movement of the micromanipulator;
S102, based on the image coordinates of the tip before and after the movement and the corresponding camera pose, the three-dimensional position of the end effector tip is estimated by the triangulation method;
S103, a position difference between the center of the focal plane of the microscope and the end effector tip is analyzed, and the end effector tip is moved to a target area by visual servo.

Preferably, the specific contents of selecting the ROI in the macro camera image and positioning the two-dimensional position of the end effector tip in the image coordinate system in S101 are as follows:
the ROI containing the end effector tip is automatically selected based on a fiducial marker;
the macro camera can obtain comprehensive environmental information about the micromanipulation system through a perspective and depth of field far greater than that of a microscope. However, the end effector, is the most concerned target in this application, only occupies a small part of the image, therefore, in order to avoid the interference of other objects in the background and improve the stability of target recognition, the system first automatically selects the ROI containing the end effector tip based on the fiducial marker.

Based on a pre-calibration of a monocular camera, an internal parameter K and a distortion coefficient D of the macro camera are obtained:

$$K = \begin{bmatrix} f_x & 0 & c_x \\ 0 & f_y & c_y \\ 0 & 0 & 1 \end{bmatrix},$$

$$D = [k_1 \ k_2 \ c_1 \ c_2 \ k_3]$$

as shown in FIG. 2, the ArUco Tag is provided with two, Tag1 and Tag2, where Tag2 is bound to the end effector of the left arm, and moves with the micromanipulator, Tag1 is bound to the microscope, and remains stationary throughout the micromanipulation process, ArUco Tag is a black-and-white square-based fiducial marker for positioning, and is used to provide efficient real-time three-dimensional position and pose estimation.

Figure 4A:
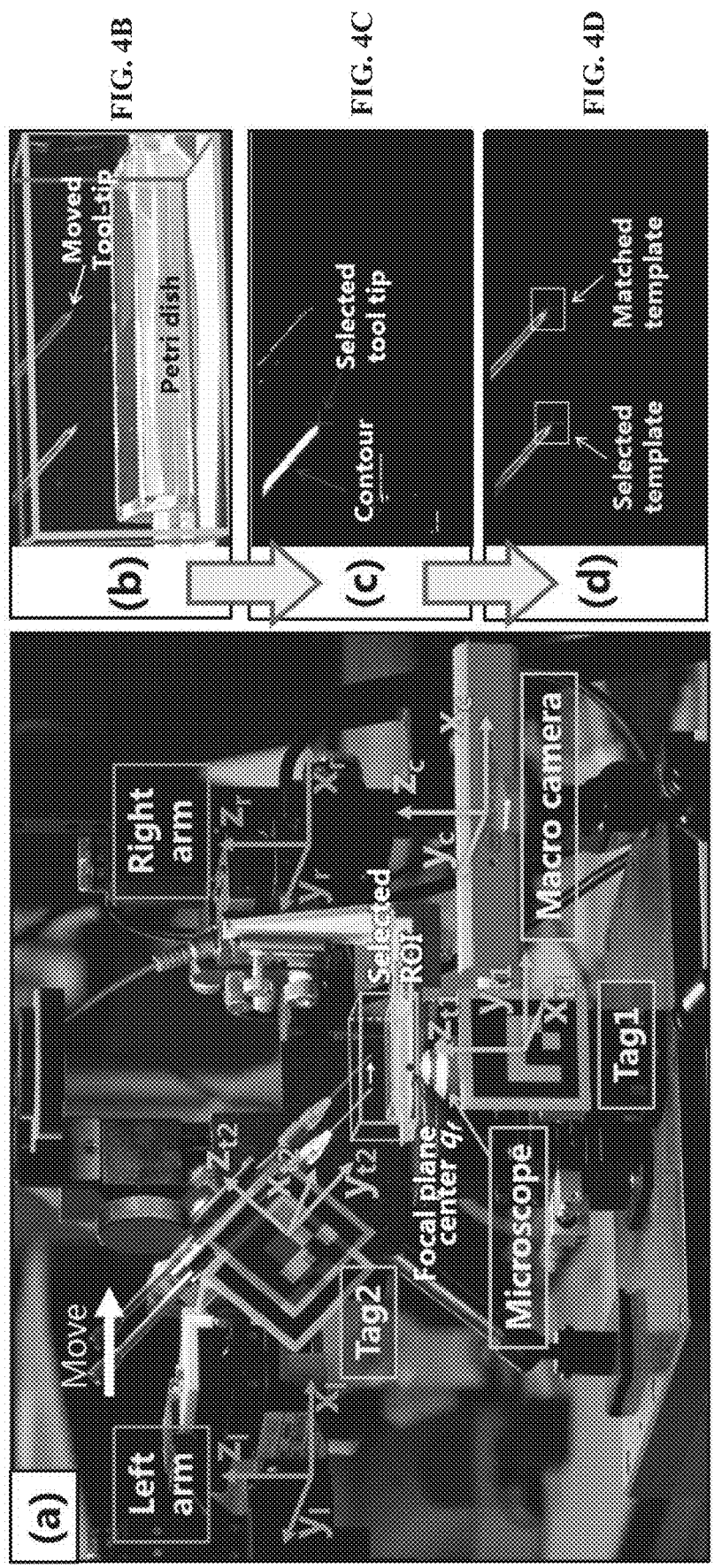

Through a calibrated camera and a known size of the ArUco Tag, a transformation relationship between a coordinate system $C_{t1}:(x_{t1}y_{t1}z_{t1})$, $C_{t2}:(x_{t2}y_{t2}z_{t2})$ of Tag1 and Tag2 and a coordinate system $C_c:(x_cy_cz_c)$ of the macro camera is obtained;

the expression of the coordinate system of Tag1 and Tag2 and the coordinate system of the macro camera is:

$$q_c = \begin{bmatrix} x_c \\ y_c \\ z_c \\ 1 \end{bmatrix} = \begin{bmatrix} R_{ti}^c & t_{ti}^c \\ 0 & 1 \end{bmatrix} \begin{bmatrix} x_{ti} \\ y_{ti} \\ z_{ti} \\ 1 \end{bmatrix} = T_{ti}^c q_{ti};$$

where, $C_{ti}$ is a coordinate system of Tag1 or Tag2, $q_c$ and $q_{ti}$ are homogeneous coordinates of a point in the three-dimensional space of the macro camera and the two-dimensional code coordinate system, respectively, and $T_{ti}^c$ is a transformation matrix, the transformation matrix is composed of 3×3 rotation matrix Rt; and 3×1 translation vector $t_{ti}^c$;

as shown in FIGS. 4A-4D, FIG. 4A is the system diagram before and after tool movement, FIG. 4B is the selected ROI, FIG. 4C is the tool tip positioning before movement based on contour analysis, and FIG. 4D is the tool tip positioning after movement based on template matching.

Based on the Tag1 bound to the microscope, according to a stroke of the micromanipulator, the rectangular region containing a movement range of the end effector tip is selected in the coordinate system $C_{t1}$ of the Tag1, as shown in FIG. 4A;

the coordinates of projection points of cuboid endpoints in the macro camera image in the Tag1 coordinate system are calculated;

the expression for calculating the coordinates of projection points of cuboid endpoints in the macro camera image in the Tag1 coordinate system is:

$$\begin{bmatrix} u \\ v \\ 1 \end{bmatrix} = \lambda K[R_{t1}^c \quad t_{t1}^c] \begin{bmatrix} x_{t1} \\ y_{t1} \\ z_{t1} \\ 1 \end{bmatrix} = \lambda M_{t1}^c \begin{bmatrix} x_{t1} \\ y_{t1} \\ z_{t1} \\ 1 \end{bmatrix};$$

where $\lambda$ denotes a scale factor, $[u,v,1]^T$ denotes pixel coordinates of the projection point, $[x_{t1}, y_{t1}, z_{t1}, 1]^T$ denotes points in the Tag1 coordinate system, and $M_{t1}^c$ denotes a projection matrix from Tag1 to the macro camera;

a circumscribed rectangle of a convex hull of the projection point is used as the ROI region;

the end effector is controlled to move laterally for a certain distance, the image matrix IMG and IMG' before and after the movement are acquired and an image difference is calculated;

according to the influence of illumination on the end effector, a positive part $IMG_{d+}$ and a negative part $IMG_{d-}$ of $IMG_d$ are defined to correspond to the end effector before and after the movement, respectively;

a silhouette image of the end effector is obtained by binarizing $IMG_{d+}$, and a maximum contour of the image is determined;

the expression for calculating the image difference is: $IMG_d = IMG - IMG'$;

a point at the bottom right of the maximum contour of the image is taken as the position of the end effector tip before the movement;

a template is selected at the position of the end effector tip of $IMG_{d+}$, and the position of the end effector tip after movement is found in $IMG_{d-}$ by a template matching method.

The end effector has a higher brightness due to illumination, so the positive part and the negative part can be considered to correspond to the end effector before and after the movement, respectively. As shown in FIG. 4C, the system will obtain the silhouette image of the end effector by binarization, find the maximum contour of the image, and use the point at the bottom right as the position of the end effector tip before the movement.

After obtaining the position of the tip before the movement, the system will select the template at the end effector tip, and find the position of the end effector tip after the movement through the template matching method, so as to ensure the consistency of the tip detection, as shown in FIG. 4D. In order to reduce the influence of image brightness changes and ensure the accuracy of visual tracking, the template matching method used in this work is based on the normalized correlation coefficient.

After obtaining the image coordinates of the end effector tip, this study adopts a method that regards the movement of the end effector as the equivalent process of the camera moving in the opposite direction at the same distance. With this perspective transformation, this application can accurately calculate the three-dimensional position of the end effector tip in the Tag2 coordinate system by triangulation method.

Triangulation is a method to determine the point according to the projection of a point in three-dimensional space on different images, this application requires the pixel coordinates of two sets of targets from different perspectives and the corresponding camera projection matrix.

Preferably, the specific contents of estimating the three-dimensional position of the end effector tip by the triangulation method in S102 are as follows:

the image coordinates of the end effector tip are obtained, and the three-dimensional position of the end effector tip in the Tag2 coordinate system is calculated by the triangulation method;

combined with the camera internal parameter K and the distortion parameter D, the pixel coordinates $p=[u, v,1]^T p'=[u',v',1]^T$ before and after the movement of the end effector tip in the de-distortion image is obtained;

a camera projection matrix corresponding to the pixel coordinates is obtained by the Tag2 that is relatively static with the end effector tip;

the homogeneous three-dimensional coordinates of the tip in the Tag2 coordinate system is defined as $q=[x, y, z, w]^T$;

where a transformation relationship between the three-dimensional point q and the two-dimensional image point p is: $p=\lambda M_{t2}^c q=\lambda K[R_{t2}^c \quad t_{t2}^c]q$, where p is the pixel coordinates before and after the movement of the end effector tip in the de-distortion image, $M_{t2}^c$ denotes the projection matrix from Tag2 to the macro camera, $R_{t2}^c$ and $t_{t2}^c$ denote a rotation and projection matrix from Tag2 to the macro camera, respectively, and K is the camera internal parameter;

according to a vector parallel relationship of p and $M_{t2}^c q$, the relationship between p and $M_{t2}^c q$ is obtained;

the relationship between p and $M_{t2}^c q$ is:

$$p \times M_{t2}^c q = \begin{bmatrix} u \\ v \\ 1 \end{bmatrix} \times \begin{bmatrix} m_1 \\ m_2 \\ m_3 \end{bmatrix} q = \begin{bmatrix} vm_3 - m_2 \\ m_1 - um_1 \\ um_2 - vm_1 \end{bmatrix} q = \begin{bmatrix} 0 \\ 0 \\ 0 \end{bmatrix};$$

where $m_1$, $m_2$, $m_3$ are 1×4 row vectors constituting $M_{t2}{}^c$, p is the pixel coordinates before and after the movement of the end effector tip in the de-distortion image;
based on the tip coordinate p' after movement and the corresponding camera projection matrix $M'_{t2}{}^c$, the relationship between p' and $M'_{t2}{}^c$ is obtained;
the relationship between p' and $M'_{t2}{}^c$ is:

$$p' \times M'^c_{t2} q = \begin{bmatrix} v'm'_3 - m'_2 \\ m'_1 - u'm'_3 \\ u'm'_2 - v'm'_1 \end{bmatrix} q = \begin{bmatrix} 0 \\ 0 \\ 0 \end{bmatrix};$$

the relationship between p and $M_{t2}{}^c$q and the relationship between p' and $M'_{t2}{}^c$ are combined with x and y, and SVD is applied to the equation x to solve a target three-dimensional point q in the containing noise situation;
it can be observed that in the formula xy, the third row is actually a linear combination of the first two rows. The formulas x and y are combined, it can be obtained:

$$Aq = \begin{bmatrix} vm_3 - m_2 \\ m_1 - um_3 \\ v'm'_3 - m'_2 \\ m'_1 - u'm'_3 \end{bmatrix} q = \begin{bmatrix} 0 \\ 0 \\ 0 \\ 0 \end{bmatrix};$$

In triangulation, the matrix A is known in this application, and the optimal three-dimensional point q with noise can be solved by the SVD method. The SVD is applied to the equation x.
The expression for the application of SVD to the solution of equation x is: $Aq = U\Sigma V^T q = 0$;
the target three-dimensional point q, $q = V_{min} = V[:, -1]$ satisfying Aq=0 is obtained by analytical expression;
where, $V_{min}$ denotes an eigenvector associated with a minimum non-zero singular value a of the matrix A, according to a definition of SVD decomposition, $v_{min}$ is the last column in the matrix V, that is V[:, −1]; as the optimal solution of the Aq=0 equation, $v_{min}$ actually minimizes the length of $\|Aq\|$.
The normalized three-dimensional coordinates of the tip $$q_{norm} = \left[\frac{x}{w}, \frac{y}{w}, \frac{z}{w}, 1\right]$$

are obtained by calculating, and the coordinate $q_{t1}$ of the end effector tip after the movement relative to Tag1 is obtained by the coordinate system transformation expression;
the coordinate system transformation expression is: $q_{t1} = T_c{}^{t1} T_{t2}{}^c q_{norm}$;
through the above formula, this application can realize real-time tracking of the end effector tip when the micromanipulator is moving based on the positioning of the fiducial marker.
In order to improve the stability and accuracy of positioning, the system performs average filtering processing on the three-dimensional position data of the end effector tip acquired continuously. Specifically, the system averages the data obtained based on the latest 5 frames of images to obtain a smoothed result $\bar{q}_{t1}$.
After determining the three-dimensional position of the end effector tip, in order to enable it to move accurately to the target area, this application needs to determine the three-dimensional position of the focal plane center as shown in the point in FIG. 4A. This can be achieved by a one-time manual end effector tip positioning: after the end effector tip positioning and tracking in the previous section is achieved, the end effector tip is manually moved to the center of the microscope image and the focus is completed, and at this time, the obtained position of the end effector tip is taken as the center position of the focal plane. It should be noted that this process only needs to be performed once in the system setup phase, and the system will automatically record the value for subsequent experiments, because the relative position of the focal plane center and Tag1 will no longer change in subsequent experiments.
Preferably, the specific contents of analyzing a position difference between the center of the focal plane of the microscope and the end effector tip, and moving the end effector tip to a target area by visual servo in S103 are as follows:
the end effector tip is manually moved to the center of the microscope image and the focusing is completed, and the position of the end effector tip $\bar{q}_{t1}$ obtained at this time is taken as $q_f$;
according to a pre-recorded focal plane center position $q_f$, the system will select $q_a = q_f + d_{offset}$ as the target position;
where, $d_{offset} = [-2, 0.2, 0.7]$, contains a horizontal offset, and is convenient for the next stage of the end effector tip positioning process based on sweeping;
the scheme of target distance difference d based on real-time feedback combined with pseudo-code performs a visual servo to first control an operator tip to move above the target area, and then move downward to the target area, thereby avoiding contact with an outer wall of the petri dish, where $d = q_a - \bar{q}_{t1} = [x_d, y_d, z_d]^T$.
The Pseudo-Code is:

---
Algorithm 1: Macro visual servo
---
// Initialize
Set all axis speeds to 0
Compute $d = [x\_d, y\_d, z\_d]^T$     // Get target distance
// Begin macro visual servo
While $|x_d| > \Delta_1$ OR $|y_d| > \Delta_1$ OR $|z_d| > \Delta_1$:

Update $d = [x_d, y_d, z_d]^T$
dist=sqrt($x_d^2 + y_d^2 + z_d^2$)     // Euclidean distance
v=k·sqrt(dist)+k_0     // Target speed
Set X axis speed to v·sign($x_d$)
Set Y axis speed to v·sign($y_d$)
if $|x_d| < \Delta_2$ AND $|y_d| < \Delta_2$:
Set Z axis speed to v·sign($z_d$)
end if
end while
Set all axis speeds to

---

Figures 5A, 5B:
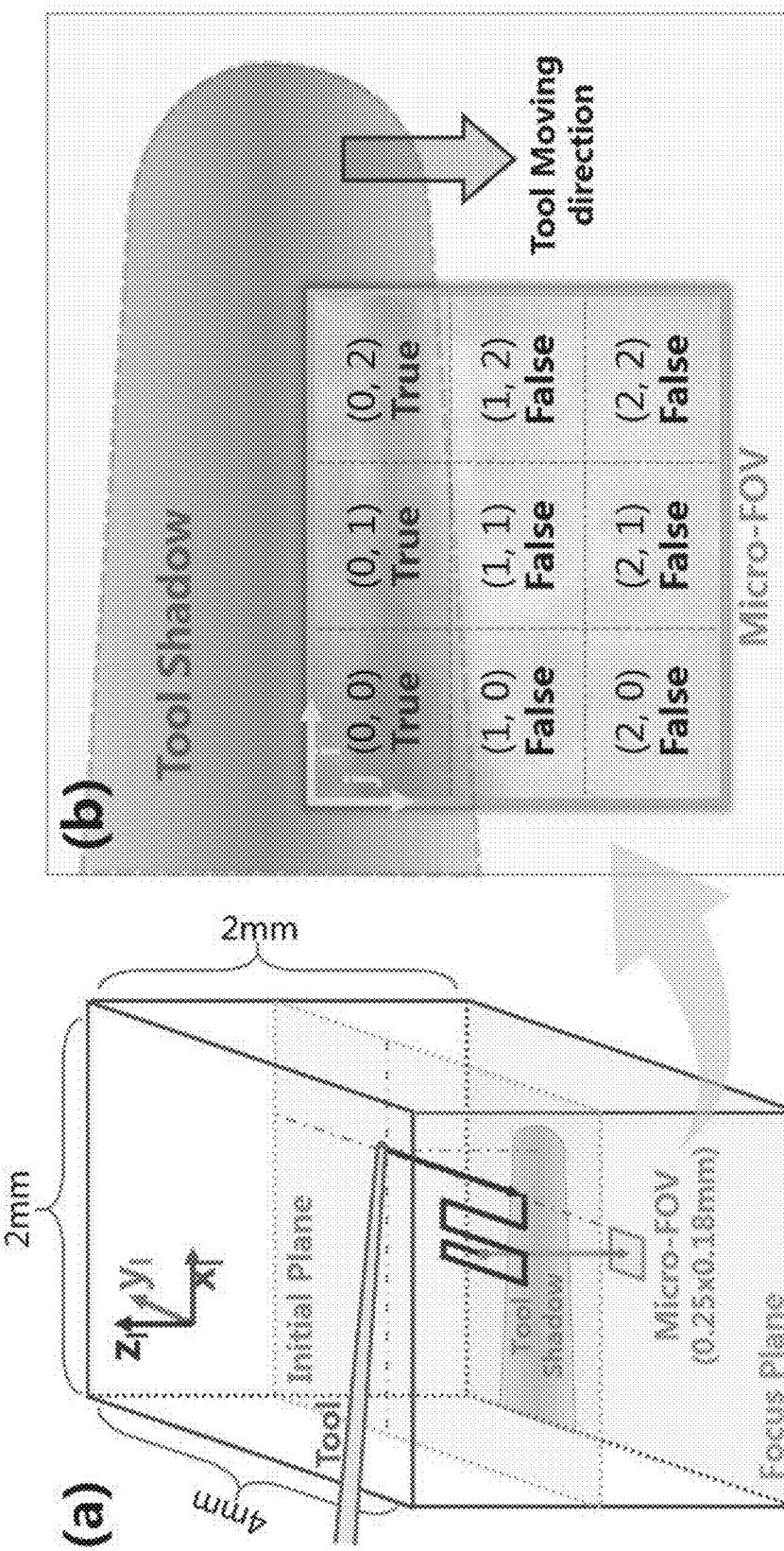
FIGS. 5A-5B are schematic diagrams of a microscopic positioning operation of an automatic end effector tip position initialization method for a micromanipulation system according to the present invention.

As shown in the pseudo-code, the system will first control an operator tip to move above the target area, and then move downward to the target area, thereby avoiding contact with an outer wall of the petri dish. Additionally, the velocity of each axis of the micromanipulator decreases with the decrease of the distance from the target.
After positioning and servoing the end effector tip in the previous stage, the tip is roughly positioned and moved to the 4×2×2 mm area near the center of the focal plane of the microscope. As shown in FIGS. 5A-5B, FIG. 5A is the initial end effector state and movement trajectory, and FIG. 5B is the schematic diagram of the tool sweep detector, the tip will be in the initial plane above the focal plane and biased to the upper right position due to the pre set, as shown in FIG. 5A. In the micro end effector tip positioning stage, the system will estimate the position of the shaft of the end effector and the end effector tip by sweeping based on the microscope image, move it from the initial state to the microscope field of view, and move the tip to the focal plane by two rounds of automatic focusing.

Through the micro end effector tip positioning in this section, the system will move the end effector tip into the field of view of the microscope and complete the focusing.

Preferably, the specific content of positioning a micro end effector tip in S2 is:

S201, the microscope image is acquired and an initialization of the tool sweep detector is completed;

S202, the position of the end effector tip is estimated based on the sweeping manner, and the end effector tip is moved into the microscope field of view;

S203, the end effector tip is moved to the focal plane by two rounds of autofocus.

Preferably, the specific contents of acquiring the microscope image and completing initialization of the tool sweep detector in S201 are as follows:

for the end effector higher than the focal plane, it will generate an enlarged blur shadow on the focal plane, the area of the shadow relative to the field of view will increase with the increase of the distance between the end effector and the focal plane and the magnification of the microscope. This section will analyze the above shadows during the movement of the end effector by constructing the tool sweep detector based on the frame difference image, so as to realize the position estimation of the end effector tip.

The microscope image is divided into 3×3 sub-regions by the tool sweep detector, where any of the sub-regions can be denoted by $r_{(m,n)}$, m, n∈(0,1,2);

in the initialization process, 60 frame difference image is acquired by the detector, a standard deviation of an average gray value of each sub-region is calculated, and a threshold is set according to the standard deviation;

the expression for calculating the standard deviation of the average gray value of each sub-region is: $\theta_{(m,n)} = k_d \cdot \sigma_{(m,n)}$;

where $\sigma_{(m,n)}$ denotes a standard deviation of the corresponding region, and $k_d$ denotes a pre-set trigger coefficient according to imaging conditions;

in the process of continuous detection, if the average gray level of the frame difference image of the region exceeds the corresponding threshold, the sub-region is marked for triggering.

Further, after the initialization of the tool sweep detector is completed, the system will control the end effector to sweep along the direction, when the end effector shadow enters the image, the corresponding sub-region will be triggered, as shown in FIG. 5B. When the three sub-regions at the bottom are triggered simultaneously, if the other six sub-regions are all triggered within the previous 0.5 s, the system will judge the end effector entering the image. Similarly, when the end effector moves in the direction, the system analyzes whether the other six sub-regions are triggered within 0.5 s to judge whether the end effector enters the image when the three sub-regions above are triggered simultaneously.

The above tool sweep detector judges whether the end effector enters the field of view by analyzing the information of the complete frame difference image, which can effectively avoid the interference caused by local cell movement and is robust to the slow change of illumination during the end effector movement.

Based on the tool sweep detector, the system controls the end effector tip to move along the red trajectory shown in FIG. 5A to the microscope field of view. Compared with the common traversal scanning starting from the corner of the workspace, the tip positioning method proposed in the present invention first positions the shaft of the end effector, and then retreats the end effector to position the tip, which can reduce the time required for positioning and improve efficiency.

The specific steps of estimating the position of the end effector tip based on the sweeping manner, and moving the end effector tip into the microscope field of view in S202 are as follows:

S2021, the end effector is swept along a $-y_1$ direction so that the end effector enters the image;

S2022, the position of the end effector in the coordinate system of the current micromanipulator is recorded, continued to move along an original sweeping direction for a distance $d_s$ to ensure that the shadow of the end effector is out of the field of view, and moved along a $-x_1$ direction for a distance $d_r$ to complete a retraction of the end effector;

S2023, the end effector is swept along the $y_1$ axis in a reverse direction, and if the end effector is detected during the movement, S2022 is repeated, and if the end effector is not detected after moving $2d_s$, judged that the retraction of the end effector is completed;

S2024, based on the average value of the $y_1$ direction position recorded in the last two times, the shaft of the end effector is moved to the image along the $y_1$ axis through the system, and the end effector is controlled to move $d_r/2$ along the $x_1$ direction, and the end effector tip is moved to the microscope field of view. In summary, an automatic end effector tip position initialization method for a micromanipulation system is proposed. Compared with the conventional technology, the present invention proposes an automatic end effector tip position initialization method for a micromanipulation system. This method combines macro and micro visual information, and uses computer vision to realize the automatic end effector tip position initialization method for the micromanipulation system.

This application has performed macro tip positioning accuracy and automatic initialization execution time experiments.

As shown in FIGS. 6A-6D, the three-dimensional positioning of the tool tip based on the macro camera can help the system to identify the approximate position of the tool tip relative to the micro field of view, and its accuracy will directly affect the time and success rate of the subsequent micro field of view.

Therefore, this paper performs experiments on the three-dimensional positioning accuracy of the tip based on the macro camera, the experimental process is as follows: first, the operator manually moves the tool tip to the center of the image and completes the focusing, the tip position at this time is used as the origin point and the position of the manipulator is recorded. After that, the system control tool to move to a random position higher than the petri dish (simulating the state of the cell operation after replacing the tool), and the three-dimensional positioning of the tip based on the macro camera is performed. After completing the three-dimensional positioning, the system control tool moves to the previously recorded origin position and reads the tip three-dimensional position estimated based on the black-and-white square-based fiducial marker. At this time, the difference with the center position of the focal plane is the three-dimensional positioning error. It is acquired by the camera in the case of facing angle of view.

Figure 6A:
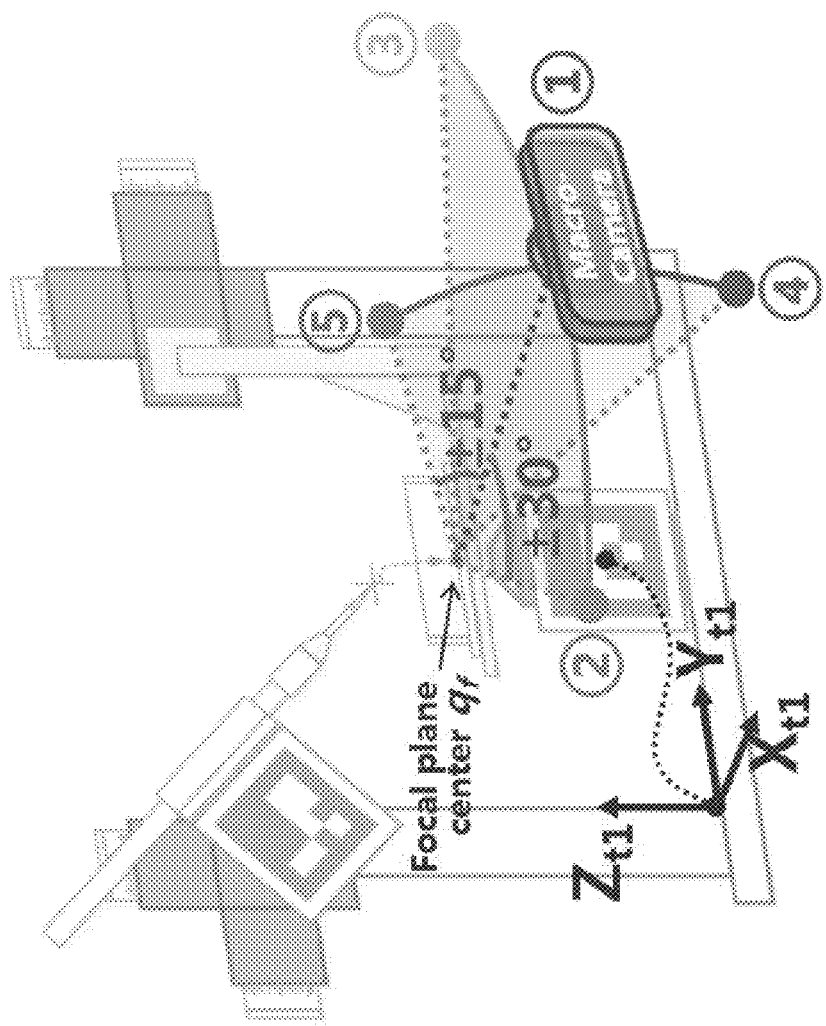
FIGS. 6A-6D are experimental result diagrams of a macroscopic tip positioning accuracy of an automatic end effector tip position initialization method for a micromanipulation system according to the present invention.
Figure 6B:
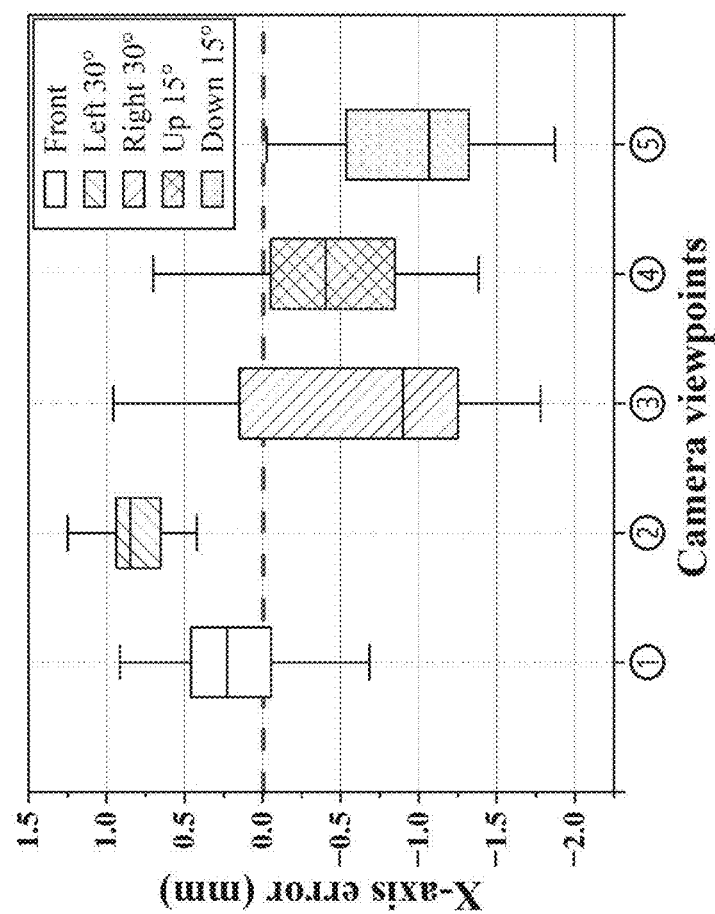
Figure 6C:
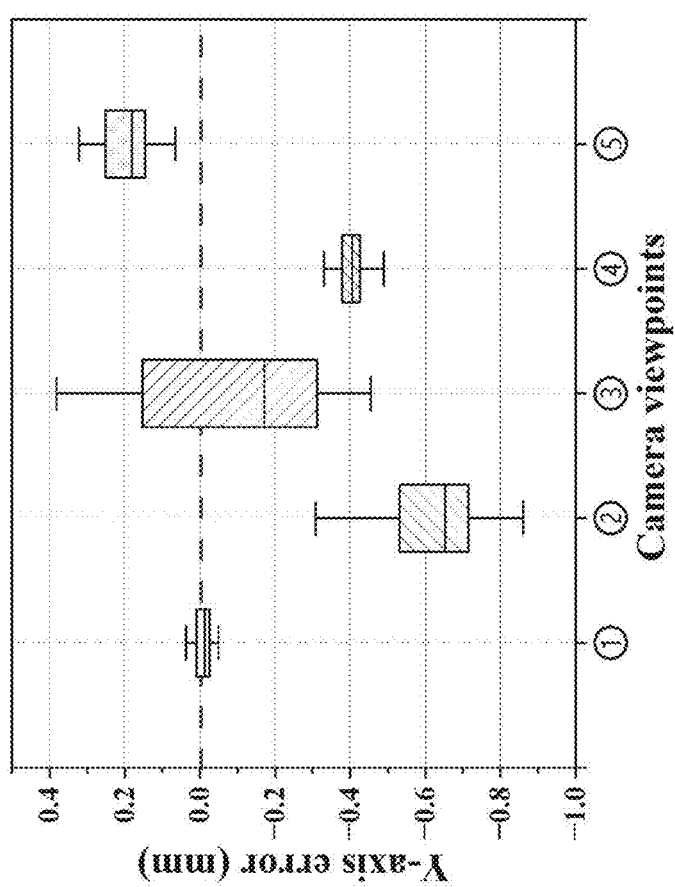
Figure 6D:
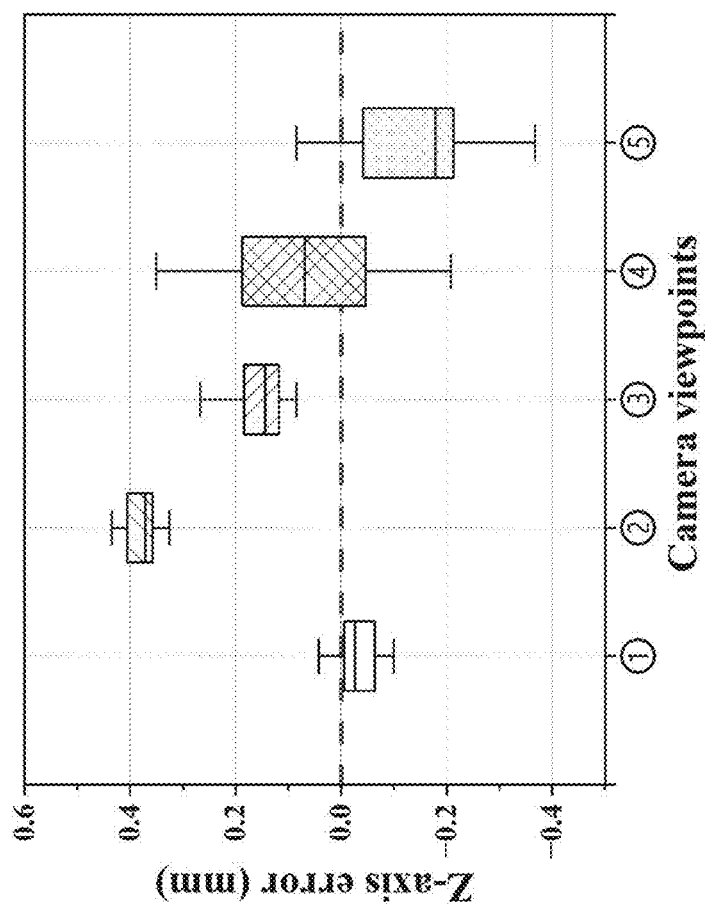

As shown in FIGS. 6A-6D, FIG. 6A is a schematic diagram of the macro tip positioning accuracy experiment, and FIG. 6B-FIG. 6D is a schematic diagram of the macro positioning error under different camera perspectives, this application has performed experiments on the macro three-dimensional positioning accuracy under five different camera perspectives to verify the system performance, that is, front view, 30° of left and right, 15° of up and down (expressed by different colors), and 30 sets of test experiments were performed in each perspective. For each viewing angle, the distance between the camera and the tool tip remains approximately the same, approximately 240 mm. (The range of the upper and lower perspectivess is smaller than that of the left and right oblique perspectivess due to the petri dish may obscure the tool tip and affect its visual positioning when pitching).

FIG. 6B-FIG. 6D shows the error distribution of the five perspectives in different directions.

It can be seen that the tool tip positioning method based on the macro camera proposed in this paper can achieve high three-dimensional positioning accuracy under different camera perspectives. Specifically, the error in the axis direction is less than 2 mm, and the error between the axis and the axis direction is less than 1 mm, the five camera perspectives can meet the accuracy requirements of the subsequent tool tip positioning task in the micro field of view. The reason for the large error in the direction of the axis is that this direction is close to the optical axis direction of the macro camera, and the depth information of the monocular camera is based on the image feature estimation, which typically has a relatively large error. In the micro estimation positioning stage, the position of the tool in the axial direction can be quickly determined by the tool sweep detector proposed in this paper, so a slightly larger error in the axial direction is acceptable.

For the error in the axial direction under different camera perspectives (FIG. 6B), the average error in the frontal direction (perspective 1) is the smallest and the fluctuation is small, the data stability in the left 30° direction (perspective 2) is the highest, while the data error in the right 30° direction (perspective 3) is large and unstable. The main reason for this result is that the Tag2 used for macro positioning in perspective 2 is close to the camera, and the larger imaging area helps to improve the accuracy and stability of the visual detection algorithm. On the contrary, perspective 3 is far away from Tag2, which leads to a decrease of accuracy and stability.

It can be seen from FIG. 6B-FIG. 6D that among the above five perspectives, the overall effect of the three-dimensional positioning of the tool tip based on perspective 1 is the best, with the smallest average error and higher stability (the maximum errors in the axial direction are 0.912 mm, −0.049 mm, −0.100 mm, the average errors are 0.213 mm, −0.087 mm, −0.030 mm, and the standard deviations are 0.376,0.024,0.038, respectively). Part of the reason for this result is that the acquisition of the center position of the focal plane is performed based on perspective 1, which helps to reduce the influence of the system error during the positioning process and reduce the average error. Additionally, the tip position of the tool can be clearly observed from perspective 1 and is not easily occluded, and the distance between the camera and the two black-and-white square-based fiducial markers is also more appropriate. Based on the above conclusions, subsequent experiments are performed based on perspective 1 to improve the accuracy and stability of macro positioning.

It should be noted that the three-dimensional positioning accuracy based on macro cameras is closely related to the image quality and the accuracy of the black-and-white square-based fiducial marker. Higher positioning accuracy can be achieved by selecting higher-resolution cameras and printing higher-precision black-and-white square-based fiducial marker.

Figure 7A:
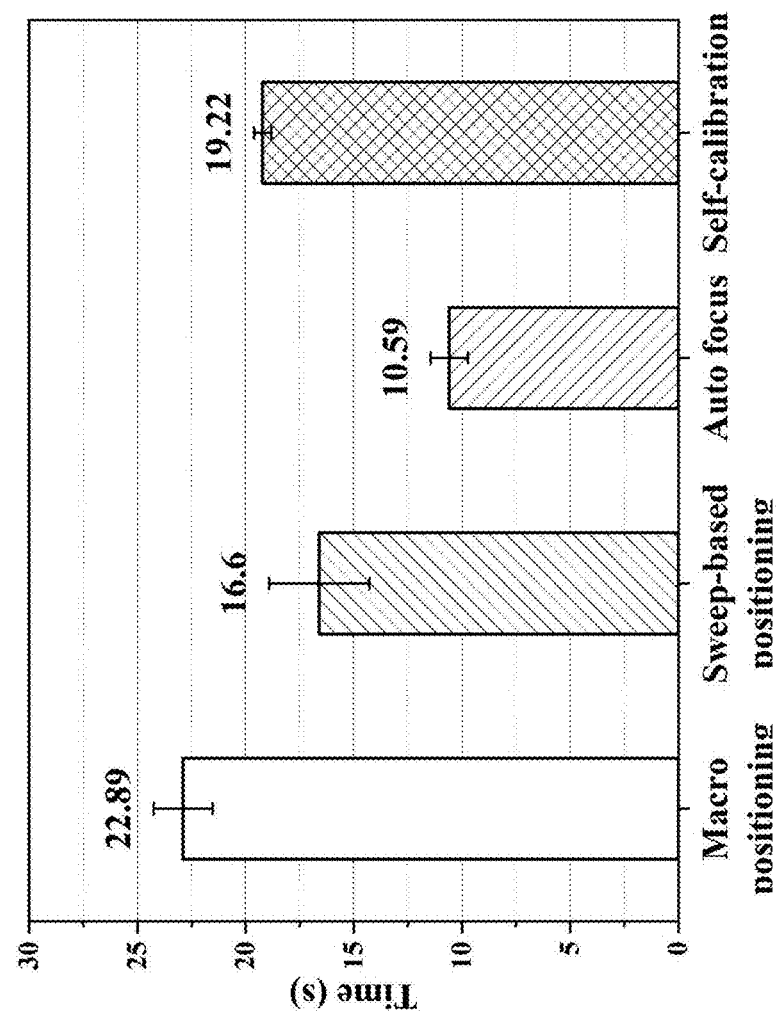
FIGS. 7A-7B are experimental result diagrams of an automatic initialization execution time of an automatic end effector tip position initialization method for a micromanipulation system according to the present invention.
Figure 7B:
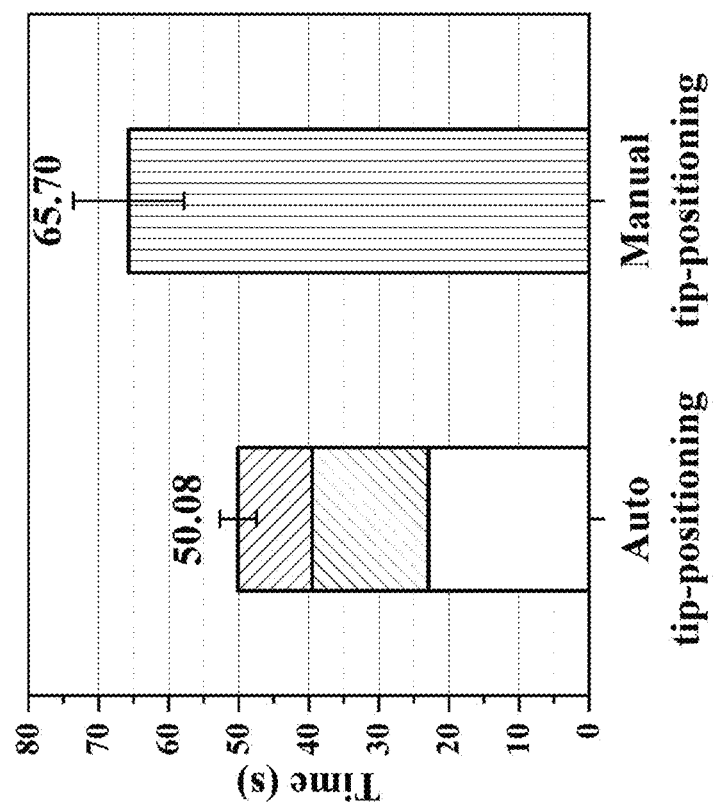

As shown in FIGS. 7A-7B, FIG. 7A is the execution time required for each sub-step in the automatic initialization process, and FIG. 7B is the execution time required for automatic and manual end effector tip positioning, the automatic initialization scheme proposed in this paper can achieve a wide range of tool tip positioning and system calibration, thereby effectively improving the efficiency of micromanipulation tasks and reducing the workload of operators. The time required for automatic initialization is an important indicator to evaluate the performance of the system. Therefore, this application performed an execution time test for each of its sub-steps, including macro tool tip positioning, micro tool tip positioning, autofocus and automatic calibration, and compares it with the time required for manual positioning of the tool by a skilled operator.

In the test phase, the tool tip is initially positioned at a random position higher than the center of the microscope focal plane. Specifically, the position difference between the tip and the center of the focal plane along the direction ranges from 5 mm to 20 mm, and the position difference along the direction ranges from −10 mm to 10 mm. The system will perform 30 automatic initializations and automatically record the time spent on each sub-step in the process.

The execution time of each sub-step obtained by the test is shown in FIG. 7A, according to the execution order of the sub-steps, the average execution time of macro positioning, sweep-based positioning, autofocus and automatic calibration is 22.89 s, 16.60 s, 10.59 s, and 19.22 s, respectively. The tool tip positioning step in the micro field of view is subdivided into two parts: sweep-based positioning and autofocus. The time statistics of automatic calibration is the calibration process of the left arm of the control tool, and the calibration process of the right arm is the same as the left arm, and the execution time is almost the same. It can be observed that the execution time of macro positioning is relatively long, because it involves a wide range of tool movement, and the limited speed of the manipulator (maximum 2.5 mm/s) makes it take a relatively long operation time. The time spent on sweeping-based positioning has a relatively large fluctuation, with a standard deviation of 2.31, this is because the error of the macro tip positioning in the axial direction makes the difference in the number of sweeping rounds during the positioning tool tip. According to statistics, the complete automatic initialization process containing the automatic tool tip positioning and the left and right manipulator calibration process takes an average of 88.52 s.

FIG. 7B shows the comparison of the time required for automatic and manual tool tip positioning. Wherein the positioning of the manual tool tip is completed by a skilled operator, also based on 30 sets of data and statistics of execution time. The test results show that the success rate of automatic and manual tool tip positioning is 100%, and the execution time of automatic tip positioning (average 50.08 s) is shorter than the execution time of manual tip positioning (average 65.70 s).

Additionally, the stability of the automatic tip positioning time (standard deviation 2.63) is also better than the stability of the manual tip positioning (standard deviation 7.90). This is mainly due to the fact that in the manual tip positioning task, the operator needs to repeatedly switch between the macro field of view and the micro field of view of the microscope to position the tool position, and the workload of this step is affected by the initial distance between the tool tip and the microscope to the focal plane center. Furthermore, in actual operation, the operator's proficiency will also significantly affect the time and success rate of manual tip positioning.

In summary, the automatic tool tip positioning scheme proposed in this paper can ensure the efficiency and stability of micromanipulation tasks and reduce the operator's workload.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. An automatic end effector tip position initialization method for a micromanipulation system, wherein the automatic end effector tip position initialization method is realized by an automatic end effector tip position initialization device for the micromanipulation system, the automatic end effector tip position initialization device comprises two sets of micromanipulators, a macro-micro integrated imaging system, and a computer/user interface;

the two sets of micromanipulators are three-axis Cartesian manipulators, the three-axis Cartesian manipulators are symmetrically distributed on left and right sides of a microscope, the three-axis Cartesian manipulators are configured to control an end effector and a petri dish respectively, and the three-axis Cartesian manipulators are defined as a left arm and a right arm respectively;

the macro-micro integrated imaging system comprises a micro-image part and a macro-image part, the micro-image part is acquired by a 20-fold objective lens digital camera, and the macro-image part is acquired by a macro camera, and macro-micro images will eventually be transmitted to the computer/user interface respectively;

the automatic end effector tip position initialization method comprises the following steps:

S1, positioning an end effector tip at a macro level by acquiring a macro image of a micromanipulation space by the macro camera, moving the end effector to analyze a position of the end effector tip in an image coordinate system, calculating a camera pose by using a black-and-white square-based fiducial marker—ArUco Tag for positioning, and realizing a three-dimensional positioning of the end effector tip by using a triangulation method, and moving the end effector to an area near a center of a focal plane based on visual servoing;

S2, positioning the end effector tip at a micro level by conducting the positioning in a 4×2×2 mm rectangular region, using a shadow projected by the end effector in a microscope image to position a shaft and the tip of the end effector, and moving the end effector tip to the focal plane;

S3, acquiring calibration data based on the visual servo, wherein the calibration data is calibration data containing micro-image position information and micromanipulator encoder position information, calibrating the end effector tip and the petri dish, and obtaining a left calibration matrix and a right calibration matrix reflecting a transformation relationship between left and right micromanipulator coordinates and image coordinates; and S4, generating an intuitive human-computer interaction interface based on a mouse and a keyboard according to position information acquired by S1-S3, wherein microscopic information in the intuitive human-computer interaction interface is configured for a local precision micromanipulation, and macroscopic information is configured for helping an operator to master a global environment.

2. The automatic end effector tip position initialization method for the micromanipulation system according to claim 1, wherein S1 further comprises:

S101, based on the ArUco Tag, selecting a region of interest (ROI) in a macro camera image, and positioning a two-dimensional position of the end effector tip in the image coordinate system through movements of the two sets of micromanipulators;

S102, based on image coordinates of the end effector tip before and after the movement and a corresponding camera pose, estimating the three-dimensional position of the end effector tip by the triangulation method;

S103, analyzing a position difference between the center of the focal plane of the microscope and the end effector tip, and moving the end effector tip to a target area by visual servoing.

3. The automatic end effector tip position initialization method for the micromanipulation system according to claim 2, wherein selecting the ROI in the macro camera image and positioning the two-dimensional position of the end effector tip in the image coordinate system in S101 comprises:

automatically selecting the ROI containing the end effector tip based on a fiducial marker;

based on a pre-calibration of a monocular camera, obtaining an internal parameter K and a distortion coefficient D of the macro camera:

$$K = \begin{bmatrix} f_x & 0 & c_x \\ 0 & f_y & c_y \\ 0 & 0 & 1 \end{bmatrix},$$

$$D = [k_1 \ k_2 \ c_1 \ c_2 \ k_3]$$

the ArUco Tag comprises Tag1 and Tag2, wherein the Tag2 is bound to the end effector of the left arm and moves with the two sets of micromanipulators, and the Tag1 is bound to the microscope and remains stationary throughout a micromanipulation process;

through a calibrated camera and a known size of the ArUco Tag, obtaining a transformation relationship between a coordinate system $C_{t1}:(x_{t1}y_{t1}z_{t1}), C_{t2}$:

$(x_{t2},y_{t2},z_{t2})$ of the Tag1 and the Tag2 and a coordinate system $C_c:(x_c,y_c,z_c)$ of the macro camera;

an expression of the coordinate system of the Tag1 and the Tag2 and the coordinate system of the macro camera is:

$$q_c = \begin{bmatrix} x_c \\ y_c \\ z_c \\ 1 \end{bmatrix} = \begin{bmatrix} R_{ti}^c & t_{ti}^c \\ 0 & 1 \end{bmatrix} \begin{bmatrix} x_{ti} \\ y_{ti} \\ z_{ti} \\ 1 \end{bmatrix} = T_{ti}^c q_{ti};$$

wherein $C_{ti}$ is a coordinate system of the Tag1 or the Tag2, $q_c$ and $q_{ti}$ are homogeneous coordinates of a point in a three-dimensional space of the macro camera and a two-dimensional code coordinate system, respectively, and $T_{ti}^c$ is a transformation matrix, the transformation matrix is composed of 3×3 rotation matrix $R_{ti}^c$ and 3×1 translation vector $t_{ti}^c$;

based on the Tag1 bound to the microscope, according to strokes of the two sets of micromanipulators, a rectangular region containing a movement range of the end effector tip is selected in the coordinate system $C_{t1}$ of the Tag1;

calculating coordinates of projection points of cuboid endpoints in the macro camera image in the Tag1 coordinate system;

an expression for calculating the coordinates of the projection points of the cuboid endpoints in the macro camera image in the Tag1 coordinate system is:

$$\begin{bmatrix} u \\ v \\ 1 \end{bmatrix} = \lambda K[R_{t1}^c \ t_{t1}^c] \begin{bmatrix} x_{t1} \\ y_{t1} \\ z_{t1} \\ 1 \end{bmatrix} = \lambda M_{t1}^c \begin{bmatrix} x_{t1} \\ y_{t1} \\ z_{t1} \\ 1 \end{bmatrix};$$

wherein $\lambda$ denotes a scale factor, $[u, v, 1]^T$ denotes pixel coordinates of the projection point, $[x_{t1},y_{t1}, z_{t1}, 1]^T$ denotes points in the Tag1 coordinate system, and $M_{t1}^c$ denotes a projection matrix from the Tag1 to the macro camera;

using a circumscribed rectangle of a convex hull of the projection point as the ROI region;

controlling the end effector to move laterally for a predetermined distance, acquiring image matrixes IMG and IMG' before and after the movement and calculating an image difference to obtain different parts of an image gray value before and after the movement;

an expression for calculating the image difference is:

$IMG_d=IMG-IMG'$;

according to an influence of an illumination on the end effector, defining a positive part $IMG_{d+}$ and a negative part $IMG_{d-}$ of $IMG_d$ to correspond to the end effector before and after the movement, respectively;

obtaining a silhouette image of the end effector by binarizing $IMG_{d+}$, and determining a maximum contour of the silhouette image;

taking a point at a bottom right of the maximum contour of the silhouette image as the position of the end effector tip before the movement; and selecting a template at the position of the end effector tip of $IMG_{d+}$, and finding the position of the end effector tip after movement in $IMG_{d-}$ by a template matching method.

4. The automatic end effector tip position initialization method for the micromanipulation system according to claim 2, wherein estimating the three-dimensional position of the end effector tip by the triangulation method in S102 comprises:

obtaining the image coordinates of the end effector tip, and calculating the three-dimensional position of the end effector tip in a Tag2 coordinate system by the triangulation method;

combining a camera internal parameter K with the distortion coefficient D to obtain pixel coordinates $p=[u, v,1]^T, p'=[u',v',1]^T$ before and after the movement of the end effector tip in a de-distorted image;

obtaining a camera projection matrix corresponding to the pixel coordinates by Tag2, wherein the Tag2 is relatively static with the end effector tip;

defining homogeneous three-dimensional coordinates of the end effector tip in the Tag2 coordinate system as $q=[x,y,z,w]^T$;

wherein a transformation relationship between a three-dimensional point q and a two-dimensional image point p is: $p=\lambda M_{t2}^c q=\lambda K[R_{t2}^c t_{t2}^c]q$, wherein p is the pixel coordinates before and after the movement of the end effector tip in the de-distorted image, $M_{t2}^c$ denotes a projection matrix from the Tag2 to the macro camera, $R_{t2}^c$ and $t_{t2}^c$ denote a rotation and the projection matrix from the Tag2 to the macro camera, respectively, and K is the camera internal parameter;

according to a vector parallel relationship of p and $M_{t2}^c q$, a relationship between p and $M_{t2}^c q$ is obtained;

the relationship between p and $M_{t2}^c q$ is:

$$p \times M_{t2}^c q = \begin{bmatrix} u \\ v \\ 1 \end{bmatrix} \times \begin{bmatrix} m_1 \\ m_2 \\ m_3 \end{bmatrix} q = \begin{bmatrix} vm_3 - m_2 \\ m_1 - um_1 \\ um_2 - vm_1 \end{bmatrix} q = \begin{bmatrix} 0 \\ 0 \\ 0 \end{bmatrix};$$

wherein $m_1, m_2, m_3$ are 1×4 row vectors constituting $M_{t2}^c$;

based on the tip coordinate p' after the movement and a corresponding camera projection matrix $M'^c_{t2}$, a relationship between p' and $M'^c_{t2}$ is obtained;

the relationship between p' and $M'^c_{t2}$ is:

$$p' \times M'^c_{t2} q = \begin{bmatrix} v'm'_3 - m'_2 \\ m'_1 - u'm'_3 \\ u'm'_2 - v'm'_1 \end{bmatrix} q = \begin{bmatrix} 0 \\ 0 \\ 0 \end{bmatrix};$$

the relationship between p and $M_{t2}^c q$ and the relationship between p' and $M'^c_{t2}$ are combined with x and y, and Singular Value Decomposition (SVD) is applied to an equation x to solve a target three-dimensional point q in a containing noise situation;

an expression for an application of SVD to a solution of the equation x is:

$Aq=U\Sigma^T q=0$;

the target three-dimensional point q, $q=V_{min}=V[:,-1]$ satisfying $Aq=0$ is obtained by analytical expression;

wherein $v_{min}$ denotes an eigenvector associated with a minimum non-zero singular value a of a matrix A, according to a definition of SVD decomposition, $v_{min}$ is a last column in a matrix V, that is $V[:, -1]$;

normalized three-dimensional coordinates of the end effector tip are obtained by calculating, and a coordinate $q_{t1}$ of the end effector tip after the movement relative to Tag1 is obtained by a coordinate system transformation expression;

the coordinate system transformation expression is:

$q_{t1} = T_c^{t1} T_{t2}^c q_{norm}$;

wherein a transformation matrix $T_{t2}^c$ describes a geometric transformation from the Tag2 coordinate system to a macro camera coordinate system, the transformation matrix $T_c^{t1}$ describes the geometric transformation from the macro camera coordinate system to a Tag1 coordinate system, $q_{norm}$ is the normalized three-dimensional coordinate of the end effector tip, $$q_{norm} = \left[\frac{x}{w}, \frac{y}{w}, \frac{z}{w}, 1\right]$$

coordinate $q_{t1}$ data obtained from latest five frames of images are averaged to obtain a smoothed result $\bar{q}_{t1}$.

5. The automatic end effector tip position initialization method for the micromanipulation system according to claim 2, wherein analyzing the position difference between the center of the focal plane of the microscope and the end effector tip, and moving the end effector tip to the target area by visual servoing in S103 comprises:

manually moving the end effector tip to the center of the microscope image and completing focusing, and taking a position of the end effector tip $\bar{q}_{t1}$ obtained at this time as $q_f$;

according to the pre-recorded focal plane center position $q_f$, the micromanipulation system will select $q_a = q_f + d_{offset}$ as a target position;

wherein $d_{offset} = [-2, 0.2, 0.7]$, contains a horizontal offset, and is convenient for a next stage of an end effector tip positioning process based on sweeping;

a scheme of a target distance difference d based on real-time feedback combined with pseudo-code performs visual servoing to first control an operator tip to move above the target area, and then move downward to the target area, thereby avoiding contact with an outer wall of the petri dish, wherein $d = q_a - \bar{q}_{t1} = [x_d, y_d, z_d]^T$.

6. The automatic end effector tip position initialization method for the micromanipulation system according to claim 1, wherein positioning the micro end effector tip in S2 comprises:

S201, acquiring the microscope image and completing initialization of a tool sweep detector;

S202, estimating the position of the end effector tip based on a sweeping manner, and moving the end effector tip into a microscope field of view; and S203, moving the end effector tip to the focal plane by two rounds of autofocus.

7. The automatic end effector tip position initialization method for the micromanipulation system according to claim 6, wherein acquiring the microscope image and completing the initialization of the tool sweep detector in S201 comprises:

dividing the microscope image into 3×3 sub-regions by the tool sweep detector, wherein any of the sub-regions is denoted by $r_{(m,n)}$, $m, n \in (0,1,2)$;

in an initialization process, acquiring 60 frame difference images by the tool sweep detector, calculating a standard deviation of an average gray value of each sub-region, and setting a threshold according to the standard deviation;

an expression for calculating the standard deviation of the average gray value of each sub-region is:

$\theta_{(m,n)} = k_d \cdot \sigma_{(m,n)}$;

wherein $\sigma_{(m,n)}$ denotes a standard deviation of the corresponding region, and $k_d$ denotes a pre-set trigger coefficient according to imaging conditions;

in a process of continuous detection, if an average gray level of the frame difference images of the region exceeds the corresponding threshold, the sub-region is marked for triggering.

8. The automatic end effector tip position initialization method for the micromanipulation system according to claim 6, wherein estimating the position of the end effector tip based on the sweeping manner, and moving the end effector tip into the microscope field of view in S202 comprises:

S2021, sweeping the end effector along a $-y_1$ direction so that the end effector enters the microscope image;

S2022, recording a position of the end effector in a coordinate system of the current micromanipulator, continuing to move along an original sweeping direction for a distance $d_s$ to ensure that the shadow of the end effector is out of the microscope field of view, and moving along a $-x_1$ direction for a distance $d_r$ to complete a retraction of the end effector;

S2023, sweeping the end effector along a $y_1$ axis in a reverse direction, and if detecting the end effector during a movement, repeating the S2022, and if not detecting the end effector after moving $2d_s$, judging that the retraction of the end effector is completed;

S2024, based on an average value of a $y_1$ direction position recorded in last two times, moving the shaft of the end effector to the microscope image along the $y_1$ axis through the micromanipulation system, and controlling the end effector to move $d_r/2$ along an $x_1$ direction, and moving the end effector tip to the microscope field of view.

* * * * *